United States Patent Office 2,935,490
Patented May 3, 1960

2,935,490

COMPOSITION COMPRISING A VINYLIDENE CHLORIDE POLYMER AND AN ORGANIC PHOSPHATE

Carl B. Havens, Hope, and Albert J. Mason and Almar T. Widiger, Midland, Mich., assignors to The Dow Chemical Company, Midland, Mich., a corporation of Delaware No Drawing. Application August 29, 1955
Serial No. 531,258

6 Claims. (Cl. 260—45.7)

This invention relates to improved vinylidene chloride compositions. More particularly, it relates to such compositions having better extrusion characteristics than previously known compositions.

Thermoplastic compositions, particularly those prepared from vinylidene chloride and other haloethylene polymers, have found wide acceptance as useful materials for making foils, fibers, filaments, and other articles. The articles are inherently strong, relatively inert to common solvents, and are easily colored for an attractive appearance. The articles are commonly shaped by thermal fabrication methods such as extrusion, and many of the heretofore employed compositions of such polymers, when extruded, have suffered from a disadvantage known as "dieface buildup." Dieface buildup is the accumulation of partially decomposed material in the die orifice and on the dieface adjacent the die orifice. When that buildup occurs it causes breakage of the article during production, clogging of the die orifice, and non-uniformity of cross-section. The only remedy for such buildup once it has occurred has been to stop production and to clean the die manually. Many unsuccessful attempts have been made to prevent that buildup by redesigning the dies, by varying the temperatures of extrusion, and by applying known lubricants to the die orifice surface. Such measures have only a temporary effect and are not easily adapted to meet even minor variations in composition. The most satisfactory solution to the problem of dieface buildup would be the provision of a composition which had no tendency to accumulate on the face of the die during extrusion.

Accordingly, it is the principal object of this invention to provide a vinylidene chloride polymer composition having a reduced tendency for dieface buildup over previously known compositions.

It is a further object to provide such a composition having increased heat stability.

The above and related objects are accomplished with a polymeric composition comprising a vinylidene chloride polymer and stabilizing quantities of an organic phosphate selected from the group consisting of the monosodium and disodium alkyl phosphates wherein the alkyl group contains from 10 to 22 carbon atoms and barium, calcium, and aluminum alkyl phosphates wherein the alkyl group contains from 18 to 22 carbon atoms.

Although any haloethylene polymer may be used in the compositions of this invention, it is preferred to employ those polymers containing a major proportion of vinylidene chloride. Vinylidene chloride polymers exhibit a peculiarly strong tendency toward dieface buildup and have a relatively high thermal sensitivity.

It is known that such vinylidene chloride polymers usually require the addition of minor amounts, usually from 3 to 7 percent, of a plasticizer for ease of fabrication and to obtain certain properties in the finished articles. Any of the conventional plasticizers, such as the dialkyl phthalates, may be employed in the compositions of this invention without any adverse effects.

Typical examples of the organic phosphates are monosodium lauryl phosphate, disodium lauryl phosphate, and disodium stearyl phosphate, and mixtures of such mono- and disodium alkyl phosphates. Further examples are aluminum stearyl phosphate, barium stearyl phosphate, and calcium stearyl phosphate. The stearyl phosphates are preferred in the compositions. The excellent results obtained with these compounds were surprising since the inorganic phosphates, such as trisodium phosphate, do not prevent dieface buildup. If the only effect desired was heat stabilizing, compounds having the greatest HCl accepting capacity should be the best, but trisodium phosphate alone or mixed with trialkyl phosphates does not prevent dieface buildup. When the alkyl groups of the sodium alkyl phosphates have less than 10 carbon atoms they do not prevent dieface buildup, and the barium, calcium and aluminum alkyl phosphates require 18 to 22 carbon alkyl groups to be effective. Those phosphates having alkyl groups containing more than 22 carbon atoms are expensive to prepare and no additional benefits accrue from using such compounds.

The phosphates should be employed in an amount of between 0.2 to 3 percent, preferably 0.5 to 2 percent, by weight based on the weight of the copolymer employed. When less than 0.2 percent is used the dieface buildup is not appreciably reduced. Amounts greater than 3 percent may be employed but no advantage is evidenced from using such amounts, and large amounts of such non-polymeric substances may reduce the strength and other properties of the finished article.

Other ingredients such as light stabilizers, fillers, and pigments, may be incorporated into the compositions without altering the effectiveness of the phosphates. Although the phosphates of this invention have some heat stabilizing influence on haloethylene polymers, it is usually desirable to add a known heat stabilizer such as tetrasodium pyrophosphate, in minor amounts, especially when the finished articles are to be subjected to prolonged periods of exposure to elevated temperatures.

The sodium alkyl phosphates may be blended into the composition by any conventional procedure. It is only necessary that the phosphate be uniformly distributed throughout the composition. It should be apparent, however, that procedures involving milling at elevated temperatures or other similar procedures should be avoided whenever possible.

When the compositions of this invention are extruded in the usual way, the amount of buildup on the dieface is reduced to a negligible amount and usually there is no such buildup. More uniform articles are produced and since there is no work stoppage due to clogged die orifices, production costs are appreciably reduced.

The advantages of the compositions of this invention will be more apparent from the following illustrative example wherein all parts are by weight.

EXAMPLE 1

A series of samples was prepared from the copolymer of 85 percent vinylidene chloride and 15 percent vinyl chloride. The formulation consisted of 90 parts of copolymer, ¼ part of sodium tripolyphosphate, 7 parts of diethyl phthalate, and 2 parts of 2-hydroxy-5-chlorobenzophenone. To the formulation were added varying amounts of different test materials listed below. The formulations were then extruded through orifices 0.030 inch in diameter, and the accumulation of dieface buildups of polymer was rated as to amount. 0=none, 3=moderate, and 7=much. The results are listed in Table I.

Table I

| Test Material | Parts added | Amount of dieface build-up after— | | |
|---|---|---|---|---|
| | | 10 min. | 30 min. | 60 min. |
| None | | 5 | 5 | 7 |
| Stearic acid | 0.5 | 5 | 6 | 7 |
| Lauric acid | 1 | 4 | 6 | 8 |
| Butyl stearate | 1 | 3 | 5 | 6 |
| Disodium lauryl phosphate | 0.5 | 2 | 3 | 5 |
| Disodium stearyl phosphate | 0.5 | 0 | 0 | 0 |
| Aluminum stearyl phosphate | 0.75 | 0 | 0 | 0 |
| Calcium stearyl phosphate | 0.75 | 0 | 0 | 0 |
| Barium stearyl phosphate | 0.75 | 0 | 0 | 0 |

The amount of dieface buildup with stearic acid, lauric acid, and butyl stearate was great enough to cause frequent stoppages for removal of the buildup. The compositions of this invention caused only a negligible amount of dieface buildup and no stoppages.

We claim:

1. A thermoplastic composition having a reduced tendency for dieface buildup comprising from 97 to 99.8 percent by weight of a vinylidene chloride polymer and correspondingly from 3 to 0.2 percent by weight of an organic phosphate selected from the group consisting of monosodium alkyl phosphates and disodium alkyl phosphates wherein each alkyl group contains from 10 to 22 carbon atoms and aluminum, barium, and calcium alkyl phosphates wherein the alkyl group contains from 18 to 22 carbon atoms.

2. The composition claimed in claim 1 wherein the organic phosphate is disodium lauryl phosphate.

3. The composition claimed in claim 1 wherein the organic phosphate is disodium stearyl phosphate.

4. The composition claimed in claim 1 wherein the organic phosphate is aluminum stearyl phosphate.

5. The composition claimed in claim 1 wherein the organic phosphate is barium stearyl phosphate.

6. The composition claimed in claim 1 wherein the organic phosphate is calcium stearyl phosphate.

References Cited in the file of this patent

UNITED STATES PATENTS 2,507,142     Chaban     May 9, 1950